United States Patent [19]

Cherry et al.

[11] Patent Number: 5,346,712
[45] Date of Patent: Sep. 13, 1994

[54] METHODS FOR INHIBITING WHITE BLUSH ON PROCESSED CARROTS

[75] Inventors: Joe H. Cherry, Auburn, Ala.; Sheo S. Singh, West Lafayette; Barry L. Friedson, Indianapolis, both of Ind.

[73] Assignee: Extended Product Life, Inc., W. Conshohochen, Pa.

[21] Appl. No.: 159,286

[22] Filed: Nov. 30, 1993

[51] Int. Cl.$^5$ .............................................. A23B 7/154
[52] U.S. Cl. ..................... 426/321; 426/324
[58] Field of Search ............................... 426/321, 324

[56] References Cited

U.S. PATENT DOCUMENTS

| | | |
|---|---|---|
| 2,011,465 | 8/1935 | Balls . |
| 2,628,905 | 2/1953 | Antle . |
| 3,352,691 | 11/1967 | Li et al. . |
| 3,637,772 | 1/1972 | Klaui et al. . |
| 4,084,008 | 4/1978 | Yueh et al. . |
| 4,241,094 | 12/1980 | O'Neil . |
| 4,297,377 | 10/1981 | Harney et al. . |
| 4,476,112 | 10/1984 | Aversano . |
| 4,514,428 | 4/1985 | Glass et al. . |
| 4,590,080 | 5/1986 | Pinegar . |
| 4,659,576 | 4/1987 | Dahle . |
| 4,937,085 | 6/1990 | Cherry et al. . |
| 5,126,153 | 6/1992 | Beck ..................... 426/269 |

FOREIGN PATENT DOCUMENTS 2057355 5/1971 France .

OTHER PUBLICATIONS

Furia, T. E., *Handbook of Food Additives* (1968), pp. 300-302, published by The Chemical Rubber Co., Cleveland, OH.
Hawley, G. G., *The Condensed Chemical Dictionary* (1981), pp. 950-951, published by Van Nostrand Reinhold Co., NY.
Fennema, O. R., *Food Chemistry* (1985), pp. 491-492, 641-643, published by Marcel Dekker, Inc., NY.
Muneta, P., "Comparisons of Inhibitors of Tyrosine Oxidation in the Enzymatic Blackening of Potatoes", *Am. Pot. J.* 58, 85:1981.
Ahmad, M. M.; El-Hakim, S.; Shehata, A., "The Effect of Amino Acids on the Activity of Synergists and Antioxidants in Two Vegetable Oils", JAOC's, vol. 60, p. 420 A; Feb., 1983.
Reitmeier, C.; Buescher, R. W., "Control of Brown End Discoloration of Snap Beans", Arkansas Farm Research, vol. 24, p. 12, 1975.

*Primary Examiner*—Joseph Golian
*Attorney, Agent, or Firm*—Woodard, Emhardt, Naughton, Moriarty & McNett

[57] ABSTRACT

A method for inhibiting the formation of white blush on processed carrots, comprising processing tile carrots for consumption and exposing the processed carrots to a solution of citric acid and L-cysteine hydrochloride, in weight percentage ratios ranging from about 71 parts citric acid to about 29 parts L-cysteine hydrochloride to about 90 parts citric acid to about 10 parts L-cysteine hydrochloride, and the remainder water until the citric acid and L-cysteine hydrochloride have been diluted to a combined weight percentage concentration of from about 0.7 to at least about 1.7 weight percent of the solution, the exposing including contacting the processed carrots with the solution for a time sufficient such that the contacting inhibits the formation of white blush on the processed carrots when the processed carrots are exposed to an atmosphere that would result in the formation of white blush on the processed carrots in the absence of the contacting.

9 Claims, No Drawings

METHODS FOR INHIBITING WHITE BLUSH ON PROCESSED CARROTS

BACKGROUND OF THE INVENTION

This invention relates generally to methods for inhibiting the discoloration of physiologically injured fruits and vegetables, and relates more particularly to methods for inhibiting the formation of white blush discoloration on freshly processed carrots.

When many fruits (i.e., apples, pears, peaches, avocados, and bananas) and vegetables (i.e., beans, potatoes, mushrooms and many root crops) are bruised, or are cut, peeled, or processed in any other way that causes tissue injury, a black or brown discoloration appears at the situs of the tissue injury within a few minutes due to enzymes of the melanosis reaction. This discoloration problem has been the subject of much study, because of its obvious economic importance to the food processing industry.

Unlike the fruits and vegetables discussed above, carrots do not develop black or brown discolorations after suffering tissue injuries due to enzymes of the melanosis reaction. Consequently, the carrot is an ideal vegetable to process shortly after harvest into a form that is ready for consumption. Of the estimated 3 billion pounds of carrots that are marketed in the United States each year, approximately 20% are peeled soon after harvest to be sold as fresh miniature carrots, carrot sticks, carrot coins, carrot shreds, and other forms of fresh processed carrots.

Whole, unprocessed carrots may be stored under refrigeration for many weeks without significantly deteriorating. However, freshly processed carrots that have been in refrigerated storage for just a few days begin to develop a whitish, chalk-like appearance on their abraded surfaces. In the carrot processing industry, this whitish, chalk-like appearance is known as "white blush."

The rate at which white blush appears on processed carrots is a function of the physiological condition of the whole carrots prior to processing, the degree of abrasiveness that was present in the processing, the chemical treatments that were applied to the carrots, if any, and the humidity levels and the temperatures at which the carrots have been stored. For example, variations in the physiology of the whole, unprocessed carrots caused by different degrees of environmental stresses during the growing period, such as heat stress and drought stress, will result in variations in the onset of white blush formation under given storage conditions. Carrots that were grown in poorly irrigated fields tend to form white blush discoloration more rapidly, than do processed carrots that were grown in well irrigated fields.

White blush discolorization is unsightly and unappetizing. As a result, consumers invariably associate white blush with distastefully old carrots, even though the taste and nutritional value of processed carrots are not affected by the appearance of white blush. This fact leads to significant commercial waste when processed carrots are pulled from the shelf due to the appearance of white blush even though taste and nutrition are not being effected.

To date, white blush has been controlled primarily by washing freshly processed carrots with chilled water, usually in a hydrocooler, followed by refrigeration and/or by packaging of the freshly processed carrots in specialized containers, including some that maintain modified atmospheres within the containers. Chlorine has also been added to the chilled water treatments for sanitation purposes, and primarily to control microbial bacteria growth on the processed carrots. However, depending upon the variables recited above, the onset of white blush may only be delayed for a few days when utilizing the methods of the prior art.

SUMMARY OF THE INVENTION

It is a principal object of the present invention to provided new methods for treating freshly processed carrots that effectively inhibit the onset of white blush formation for a reasonably long period of time, consistent with commercial requirements. The methods of the present invention effectively slow the dehydration of the abraded cell walls of processed carrots that results in the formation of white blush. Furthermore, the methods of the present invention utilize safe and natural chemicals that are effective in sufficiently low concentrations that they do not impart off-colors or tastes to the treated, processed carrots.

One embodiment of the present invention is a method for inhibiting the formation of white blush on processed carrots, comprising processing the carrots for consumption and exposing the processed carrots to a solution of citric acid and L-cysteine hydrochloride, in weight percentage ratios ranging from about 71 parts citric acid to about 29 parts L-cysteine hydrochloride to about 90 parts citric acid to about 10 parts L-cysteine hydrochloride, and the remainder water until the citric acid and L-cysteine hydrochloride have been diluted to a combined weight percentage concentration of from about 0.7 to at least about 1.7 weight percent of the solution, the exposing including contacting the processed carrots with the solution for a time sufficient such that tile contacting inhibits the formation of white blush on the processed carrots when the processed carrots are exposed to an atmosphere that would result in the formation of white blush on the processed carrots in the absence of the contacting.

Another embodiment of the present invention is the method for inhibiting the formation of white blush on processed carrots set forth in the immediately preceding paragraph, and further comprising treating the processed carrots prior to, or after, or both prior to and after the exposing step with chlorinated water having a chlorine concentration of from about 50 ppm to less than about 150 ppm.

Related objects and advantages of the methods of the present invention will be evident from the following detailed description.

DESCRIPTION OF THE PREFERRED EMBODIMENTS

For the purposes of promoting an understanding of the principles of the invention, reference will now be made to the preferred embodiments in the description and Examples that follow, and specific language will be used to describe the same. It will nevertheless be understood that no limitation of the scope of the invention is thereby intended, such alterations and further modifications in the preferred embodiments, and such further applications of the principles of the invention as described therein being contemplated as would normally occur to one skilled in the art to which the invention relates.

The processed carrots that were utilized in the following examples were Imperator and Nantes varieties, which were acquired directly from carrot processors in California. Nantes varieties have a thinner cell wall structure than do the Imperator varieties, making processed Nantes variety carrots more susceptible to white blush formation.

EXAMPLE 1

Freshly processed Nantes variety mini (baby) carrots from a central California processing plant, which had been hydrocooled, bagged, and packed in ice, were transported to a laboratory facility where they were treated in the following manner within six (6) hours after leaving the processing plant.

A control group of the carrots weighing approximately 0.5 pounds was submerged for 30 seconds in a 36° F. water bath containing 100 ppm chlorine to approximate the carrot processor's present production procedure for freshly processed mini (baby) carrots. The control group was then bagged in the processor's standard, perforated film and placed in refrigerated storage at about 42° F.

A solution of 71 weight percent food grade citric acid and 29% weight percent L-cysteine hydrochloride was diluted with 36° F. tap water to a final concentration of about 1.7 weight percent citric acid and L-cysteine hydrochloride. A test group of the same carrots, also weighing approximately 0.5 pound, was then submerged in the chilled 1.7 weight percent citric acid and L-cysteine hydrochloride solution for about 15 minutes. The test group was then submerged for 30 seconds in a 100 ppm chlorinated water bath, also at about 36° F., bagged in the same perforated film, and placed in refrigerated storage at about 42° F.

After 10 days, the control group and the test group carrots where removed from storage and examined for white blush formation. The control group had already formed white blush. The test group, by contrast, was still moist, had good color and taste, and exhibited no white blush. The test group was returned to refrigerated storage, and was examined again after 17 days and after 26 days of refrigerated storage. Again, the test group was still moist, with good color and taste and with no white blush formation, at each examination.

EXAMPLE 2

Freshly processed Nantes variety quartered carrot sticks produced by a central California processing plant, which had been hydrocooled, bagged, and packed in ice, were transported to a laboratory facility where they were treated in the following manner within six (6) hours after leaving the processing plant.

A control group of the carrots weighing approximately 0.5 pounds was submerged for 30 seconds in a 36° F. water bath containing 100 ppm chlorine to approximate the carrot processor's present production procedure for freshly processed quartered carrot sticks. The control group was then bagged in the processor's standard unperforated film and placed in refrigerated storage at about 42° F.

A solution of 71 weight percent food grade citric acid and 29 weight percent L-cysteine hydrochloride was diluted with 36° F. tap water to a final concentration of about 1.7 weight percent citric acid and L-cysteine hydrochloride. A 0.5 pound test group of the same carrots was then submerged in the chilled 1.7 weight percent citric acid and L-cysteine hydrochloride solution for about 15 minutes. The test group was then submerged for 30 seconds in a water bath containing 100 ppm chlorine, also at about 36° F., and was bagged in the same unperforated film, and placed in refrigerated storage at about 42° F.

After 10 days, the control group and the test group carrots where removed from storage and examined for white blush formation. The control group had already formed white blush. The test group, by contrast,! was still moist, had good color and taste, and exhibited no white blush. The test group was returned to refrigerated storage, and was examined again after 17 days and after 26 days of refrigerated storage. Again, the test group was still moist, with good color and taste and with no white blush formation, at each examination.

EXAMPLE 3

Freshly processed Imperator variety mini (baby) carrots that were being processed by a central California processing plant were treated in the following manner during processing.

A solution of 75 weight percent food grade citric acid and 25 weight percent L-cysteine hydrochloride was diluted with tap water to a final concentration of about 1.32 weight percent citric acid and L-cysteine hydrochloride. A test group of the carrots was showered for about 10 minutes with the 1.32 weight percent citric acid and L-cysteine solution in a hydrocooler that chilled the solution to about 38°-42° F. The test group was then showered for 1 second with a 50° F. water bath containing 90-100 ppm chlorine flowing at a rate of one-third to one-half gallon per minute from a fixed spray head. The carrots moved under the spray head at a rate of one pound per second. The test group was then bagged in one pound packages of the processor's standard, perforated film and placed in refrigerated storage ranging from about 38°-55° F.

After 23 days, the test group was examined for white blush. The test group was still moist, had good color and taste, and exhibited no white blush.

EXAMPLE 4

Freshly processed Imperator variety mini (baby) carrots produced by a central California processing plant, which had been hydrocooled, bagged, and packed in ice, were transported to a laboratory facility, where they were treated in the following manner within thirty-six (36) hours after leaving the processing plant.

A control group of the carrots weighing approximately 1.0 pound was submerged for 1 minute in a 40° F. water bath containing 100 ppm chlorine to approximate the processor's present production procedure for freshly processed mini (baby) carrots. The control group was then bagged in the processor's standard, perforated film and placed in refrigerated storage at 42° F.

A 1.0 pound test group of the same carrots was first submerged for 1 minute in a 40° F. water bath containing 100 ppm chlorine. A solution of 90 weight percent food grade citric acid and 10 weight percent L-cysteine hydrochloride was diluted with 40° F. tap water to a final concentration of about 1.1 weight percent citric acid and L-cysteine hydrochloride. The test group was then submerged in the chilled 1.1 weight percent citric acid and L-cysteine solution for 25 minutes. The test group was then submerged again for one minute in a 40° F. water bath containing 100 ppm chlorine, bagged in the same perforated film, and placed in refrigerated storage at 42° F.

After 26 days, the control group and the test group where examined for white blush. The control group was dry and had formed white blush. The test group, by contrast, was still moist, had good color and taste, and had no white blush.

EXAMPLE 5

Freshly processed Imperator variety quartered carrot sticks produced by a central California processing plant, which had been hydrocooled, bagged, and packed in ice, were transported to a laboratory facility where they were treated in the following manner within thirty-six (36) hours after leaving the processing plant.

A control group of the carrots weighing approximately 2.0 ounces was submerged for 1 minute in a 40° F. water bath containing 100 ppm chlorine to approximate the processor's present production procedure for freshly processed quartered carrot sticks. The control group was then bagged in the processor's standard, unperforated film and placed in refrigerated storage at 42° F.

A 2.0 ounce test group of the same carrots was first submerged for 1 minute in a 40° F. water bath containing 100 ppm chlorine. A solution of 90 weight percent food grade citric acid and 10 weight percent L-cysteine hydrochloride was diluted with 40° F. tap water to a final concentration of about 1.1 weight percent citric acid and L-cysteine hydrochloride. The test group was then submerged in the chilled 1.1 weight percent citric acid and L-cysteine solution for approximately 15 minutes, and finally for 1 minute in a 40° F. water bath containing 100 ppm chlorine. The test group was then bagged in the same unperforated film, and placed in refrigerated storage at about 42° F.

After 26 days, the control group and the test group where examined for white blush. The control group was dry and had formed white blush. The test group, by contrast, was still moist, had good color and taste, and had only slight white blush that was within commercially acceptable limits.

EXAMPLE 6

Freshly processed Imperator variety carrot sticks produced by a central California processing plant were taken in bulk from the production line, prior to being hydrocooled, and were transported to a laboratory facility where they were treated in the following manner shortly after leaving the processing plant.

A control group of the carrots weighing approximately 0.5 pound was submerged for 15 minutes in a 34° F. tap water bath to approximate the processor's present production procedure for freshly processed carrot sticks. The control group was then bagged in a zip-lock brand polyethylene bag with one small pinhole, and placed in refrigerated storage at about 42° F.

A solution of 90 weight percent food grade citric acid and 10 weight percent L-cysteine hydrochloride was diluted with chilled water to a final concentration of about 1.1 weight percent citric acid and L-cysteine hydrochloride. Temperature of the solution was measured to be about 28° F. A 0.5 pound test group of the same carrots was then submerged for 15 minutes in the chilled 1.1 weight percent citric acid and L-cysteine hydrochloride solution. The test group was then bagged in a zip-lock brand polyethylene bag with one small pin hole, and placed in refrigerated storage at about 32° F.

After 28 days, the control group and the test group where examined for white blush formation. The control group had formed white blush. The test group, by contrast, was still moist, had good color and taste, and had no white blush.

The solutions utilized in the methods of the present invention may be contacted with freshly processed carrots in the conventional ways, such as by dipping, spraying or showering, including contacting the carrots with the solutions in the conventional hydrocoolers utilized by carrot processors, as set forth in the Examples, above.

While the invention has been described in the Examples and descriptions, above, the same is to be considered as illustrative and not restrictive in character, it being understood that only the preferred embodiments have been described and that all changes and modifications that come within the spirit of the invention are desired to be protected. Variations in the physiologies of whole carrots from different growing areas, and differences in the heat and drought stresses experienced by the whole carrots prior to processing will require slight modifications in the methods set forth in the foregoing Examples to most efficiently inhibit the onset of white blush. For example, in testing completed to date, solutions of 90 weight percent food grade citric acid and 10 weight percent L-cysteine hydrochloride have been diluted with tap water to a final concentration as low as about 0.7 weight percent citric acid and L-cysteine hydrochloride, have been chilled, and have been contacted with processed carrots in conventional ways, and have effectively delayed the onset of white blush on processed carrots that had not been severely stressed environmentally. Similarly, in testing completed to date the chilled water baths utilized in some of the Examples of the preferred embodiments have had chlorine concentrations as low as 50 ppm and some as high as just slightly less than 150 ppm, and have been chilled to temperatures ranging from about 28° F. to about 55° F., yet have still efficiently contributed to the inhibition of white blush formation and microbial bacteria growth on processed carrots that had experienced varying degrees of environmental stress.

What is claimed is:

1. A method for inhibiting the formation of white blush on processed carrots, comprising processing the carrots for consumption and exposing the processed carrots to a solution of citric acid and L-cysteine hydrochloride, in weight percentage ratios ranging from about 71 parts citric acid to about 29 parts L-cysteine hydrochloride to about 90 parts citric acid to about 10 parts L-cysteine hydrochloride, and the remainder water until the citric acid and L-cysteine hydrochloride have been diluted to a combined weight percentage concentration of from about 0.7 to at least about 1.7 weight percent of the solution, said exposing including contacting the processed carrots with the solution for a time sufficient such that said contacting inhibits the formation of white blush on the processed carrots when the processed carrots are exposed to an atmosphere that would result in the formation of white blush on the processed carrots in the absence of said contacting.

2. The method for inhibiting the formation of white blush on processed carrots of claim 1 wherein the solution of said exposing is of citric acid and L-cysteine hydrochloride in a weight percent ratio of about 75 parts citric acid to about 25 parts L-cysteine hydrochloride, and the remainder water until the citric acid and L-cysteine hydrochloride have been diluted to a combined weight percentage concentration of about 1.32 weight percent of the solution.

3. The method for inhibiting the formation of white blush on processed carrots of claim 1 wherein the solution of said exposing is of citric acid and L-cysteine hydrochloride in a weight percent ratio of about 90 parts citric acid to about 10 parts L-cysteine hydrochloride, and the remainder water until the citric acid and L-cysteine hydrochloride have been diluted to a combined weight percentage concentration of about 1.1 weight percent of the solution.

4. The method for inhibiting the formation of white blush on processed carrots of claim 1 wherein the solution of said exposing is of citric acid and L-cysteine hydrochloride in a weight percent ratio of about 90 parts citric acid to about 10 parts L-cysteine hydrochloride, and the remainder water until the citric acid and L-cysteine hydrochloride have been diluted to a combined weight percentage concentration of about 0.7 weight percent of the solution.

5. The method for inhibiting the formation of white blush on processed carrots of claim 1 wherein the solution of said exposing is of citric acid and L-cysteine hydrochloride in a weight percent ratio of about 71 parts citric acid and 29 parts L-cysteine hydrochloride, and the remainder water until the citric acid and L-cysteine hydrochloride have been diluted to a combined weight percentage concentration of about 1.7 weight percent of the solution.

6. The method for inhibiting the formation of white blush on processed carrots of any one of claims 1 to 5 wherein the solution of said exposing is chilled to a temperature of from about 28° F. to about 55° F.

7. The method for inhibiting the formation of white blush on processed carrots of claim 6, and further comprising treating said processed carrots prior to said exposing with chlorinated water having a chlorine concentration of from about 50 ppm to less than about 150 ppm.

8. The method for inhibiting the formation of white blush on processed carrots of claim 6, and further comprising treating said processed carrots after said exposing with chlorinated water having a chlorine concentration of from about 50 ppm to less than about 150 ppm.

9. The method for inhibiting the formation of white blush on processed carrots of claim 6, and further comprising treating said processed carrots prior to and after said exposing with chlorinated water having a chlorine concentration of from about 50 ppm to less than about 150 ppm.

* * * * *